Dec. 20, 1960   C. J. RENKEN, JR., ET AL   2,965,840
METAL RESISTIVITY MEASURING DEVICE
Filed Jan. 23, 1959   3 Sheets-Sheet 1
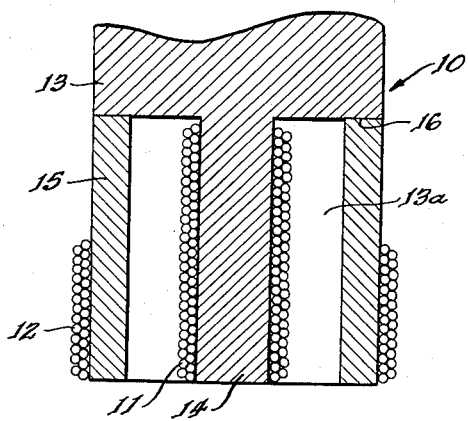
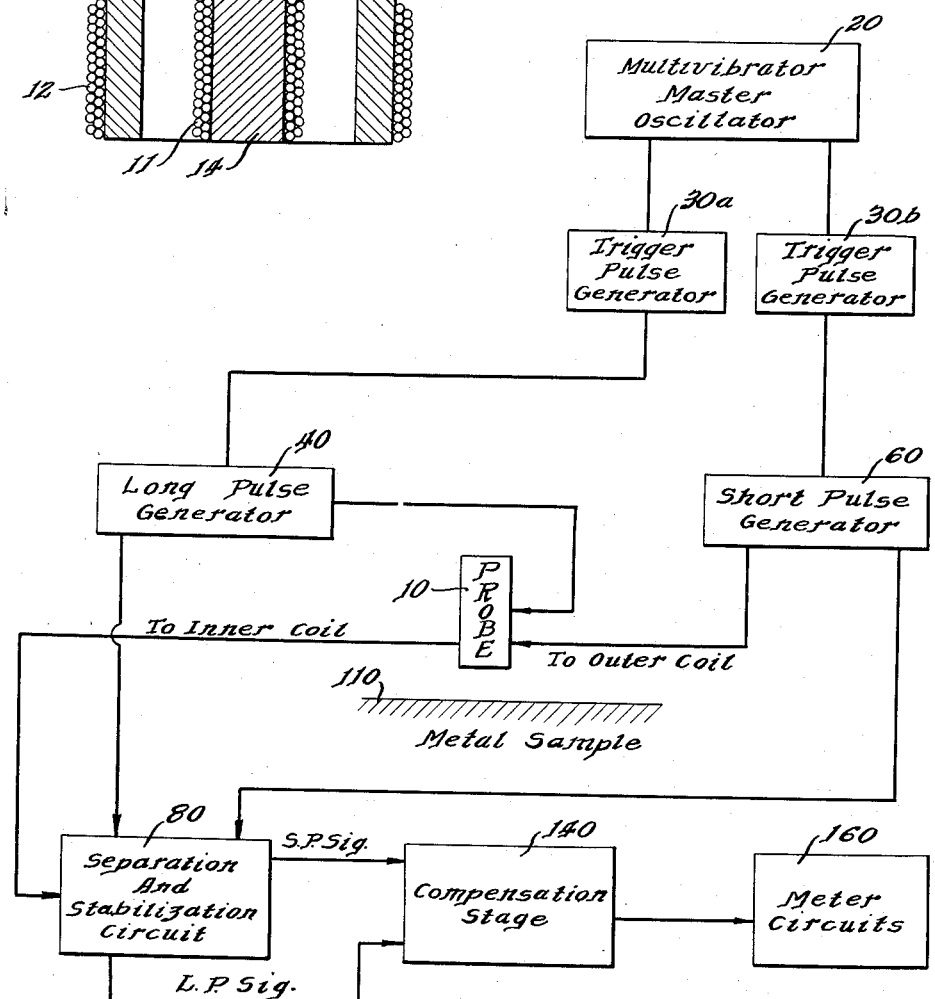
INVENTORS
Roland G. Meyers
Claus J. Renken, Jr.
BY
Roland C. Anderson
Attorney

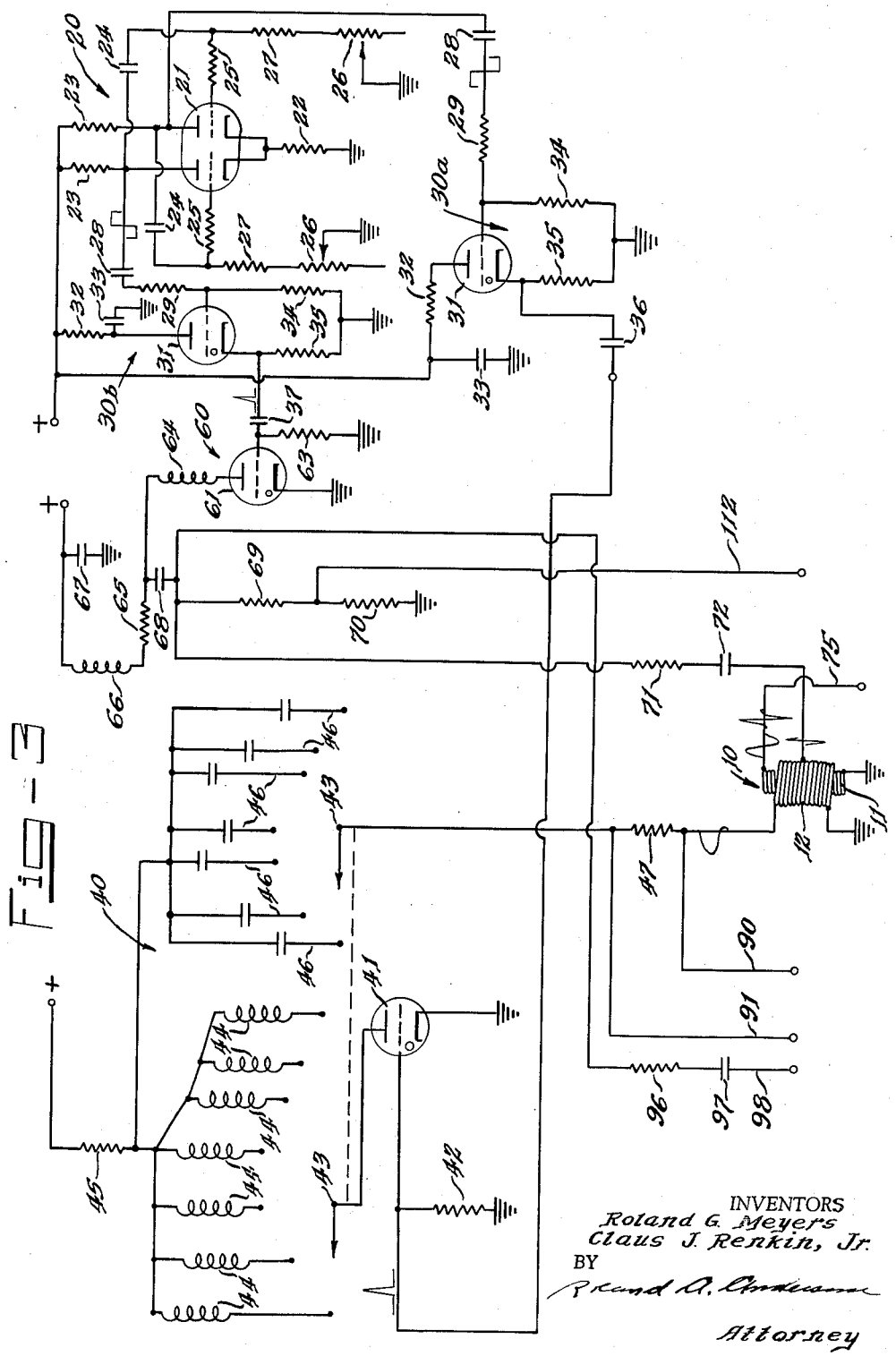

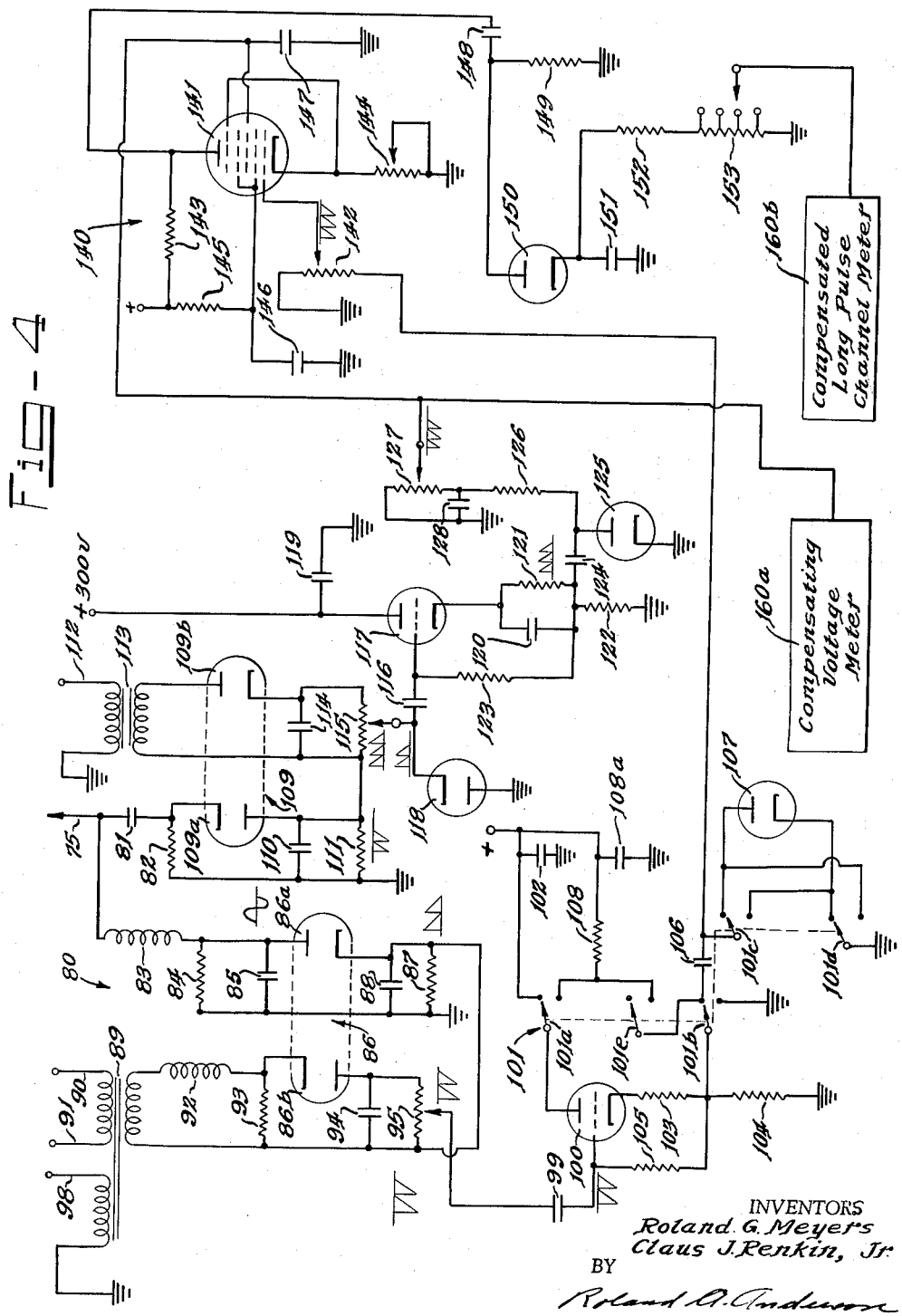

United States Patent Office 2,965,840
Patented Dec. 20, 1960

2,965,840
METAL RESISTIVITY MEASURING DEVICE

Claus J. Renken, Jr., Orland Park, and Ronald G. Myers, Downers Grove, Ill., assignors to the United States of America as represented by the United States Atomic Energy Commission Filed Jan. 23, 1959, Ser. No. 788,692

11 Claims. (Cl. 324—37)

This invention relates to metal resistivity measuring methods and devices. More particularly it relates to metal conductivity measuring methods and devices which are useful in the detection of discontinuities in metal objects such as, cracks, voids and unbonded areas of clad metal objects.

It is well known that an electric field brought within proximity of a metal object will cause eddy currents to be induced in the metal. The induced eddy currents set up their own electric fields which affect the electric field originally applied by altering the impedance of the field generating circuit. It is this effect on the impedance which is the fundamental principle behind most eddy current type metal conductivity measuring devices. The eddy current technique, as it is generally termed, is especially suited for quality control of plated or metal clad objects such as fuel elements for nuclear reactors because it may be employed without causing destruction of the element to find flaws or discontinuities beneath the outside surface of the object. However, in quality control applications it is essential that the results measured reflect only the conductivity of the metal.

One of the major faults of eddy current instruments is that they are generally sensitive to changes in spacing between the probe and the sample being tested. Variations in the air gap between the probe and the sample disturb the loading of the probe which in effect change its inductance and resistance, and, thus, alter the generated signal therein. The resultant signal is therefore a relatively insensitive and inaccurate measure of the conductivity of the metal.

It is therefore an object of this invention to provide devices for measuring metal conductivity which are highly sensitive to detect continuities in metal samples.

It is another object of this invention to provide devices for measuring metal resistivity which are insensitive to changes in the air gap between the probe and the metal sample being tested.

Another object of this invention is to provide a method for measuring metal resistivity using eddy current techniques whereby a reading may be directly obtained indicative of the presence of a discontinuity in the metal and which does not reflect any changes in the surface condition or the spacing between the instrument and the surface of the sample being tested.

Other objects will be apparent as the detailed description of the invention proceeds.

In general the objects and advantages of this invention are accomplished by inductively applying a signal comprising alternately long and short duration pulses to said metal. It has been found that the long pulses induce eddy currents which permeate into the metal and are substantially affected by the conductivity of the metal. The short pulses, however, cause eddy current disturbances which remain essentially on the surface of the metal sample; and the amplitude of the disturbances in the useful portion of the generated signal is substantially unaffected by the conductivity of all metals with resistivity in the range of 1.63 to 150 microhms per centimeter cubed. Since both the long and the short pulses are affected by changes in the spacing between the probe and the sample, the short pulse generated signal may be separated and used to compensate the amplitude of the long pulse signals, thereby eliminating any probe-to-sample spacing effect.

The invention will be more clearly understood from the following detailed description in conjunction with the accompanying drawings which form a part of this specification in which:

Fig. 1 is a block diagram of a device provided for the practice of this invention;

Fig. 2 is a partial section view of a portion of a probe useful in the device shown in Fig. 1;

Fig. 3 is a detailed schematic drawing of the first stages of the device block diagrammed in Fig. 1; and Fig. 4 is a detailed schematic drawing of the last stages of the device block diagrammed in Fig. 1.

In the embodiment of the apparatus of the invention diagrammed in Fig. 1 a probe 10 is energized by a network comprising a master oscillator 20 having two outputs which in the instant case are 180° out of phase with each other. Each of the output signals from the master oscillator 20 is shaped into pulses by the trigger pulse generators 30a and 30b. The output from the trigger pulse generator 30a is used to trigger a long pulse generator 40 which in turn energizes the probe 10, and the output of the trigger pulse generator 30b causes a short pulse generator 60 to energize the probe 10 with short duration pulses. The probe 10 induces signals responsive to the long and short duration pulses in a separation and stabilization circuit 80. The amplitude of each of the signals is responsive to the presence of a metal sample 110 within proximity of the probe 10.

The separated and stabilized short pulse and long pulse signals are individually transmitted to a compensation stage 140 wherein the amplitude of the short pulse signal is used to compensate the amplitude of the long pulse signal. Since the short pulse signal is not affected by changes in the resistivity of the metal sample but is responsive to changes in the spacing between the probe 10 and the metal sample; it is used to counteract the effects of any spacing variations appearing in the long pulse signal. The output of the compensation stage 140, which is metered in the circuit 160, is thus a relatively true measure of the resistivity of the metal sample.

The probe 10, of which Fig. 2 is an enlarged view of a portion thereof, comprises an inner coil 11 and an outer coil 12 wound upon a ferromagnetic core 13. The inner coil 11 is disposed within an annular recess 13a in the end of the probe. The outer coil 12 is disposed around the outside of the probe concentrically with the inner coil 11. To facilitate construction of the probe, the ferromagnetic core 13 comprises a cylindrical extension 14 upon which the inner coil 11 is wound, and an annular member 15, attached to the remainder of the probe 10 at 16, upon which the outer coil 12 is wound. The probe is constructed in this manner because of its very small size. The diameter of the outer coil 12 used in a model of this device was approximately ¼″ while the diameter of the inside coil was approximately ⅟₁₆″. Since electric pulses rather than a sinusoidal waveform of alternating current are used in the coils, the windings or coils 11 and 12 may be made of very light wire and still be subjected to high amplitude signals. The dimensions of the probe being relatively small cause the device to have a sharper resolution for detecting flaws in the metal samples.

The arrangement of the electrical circuits of the entire device is indicated in the circuit diagram of Figs. 3 and 4. It will be noted that the circuit diagram is keyed to the block diagram of Fig. 1 by the reference numerals. A master oscillator 20 is schematically shown on the right side of Fig. 3 along with the trigger pulse generators 30a and 30b. Also shown in Fig. 3 are the long and short pulse generators 40 and 60, respectively, and the probe 10. The separation and stabilization circuit 80, the compensation stage 140, and the meter circuits 160 are schematically depicted in Fig. 4.

The master oscillator 20 is a free-running multivibrator comprising a double-triode 21 having its cathodes commonly connected through resistor 22 to ground. The plate of each of the triodes in the tube 21 is connected through a load resistor 23 to a positive power supply as well as to the grid of the other triode through a capacitor 24 and a resistor 25. The period of each half-cycle of the multivibrator output is selectively established by the potentiometers 26 and the dropping resistors 27. The multivibrator operates by well-known feedback principles and need not be further described to those skilled in the art.

The oppositely phased square wave signals appearing on the plates of the multivibrator 21 are each supplied through their respective coupling capacitors 28 and resistors 29 to the control grids of their respective thyratrons 31 which form a part of the trigger pulse generators 30a and 30b. Each of the thyratrons 31 has its plate connected to a positive power supply through a resistor 32 and to ground through a cutoff capacitor 33 to ground. The grid of each thyratron 31 is connected to ground through a grid resistor 34. The output of each generator is taken across a cathode resistor 35. Responsive to the positive half cycles of the square wave multivibrator output each of the thyratrons conducts to discharge the cutoff capacitor 33 which is charged to the power supply voltage during the nonconduction time of the thyratron. When the capacitor is discharged the voltage across the thyratron approaches zero and it ceases to conduct.

The output of the trigger pulse generator 30a is supplied through a coupling capacitor 36 to the grid of a thyratron tube 41 forming a part of the long duration pulse generator 40. The grid of the thyratron 41 is connected to ground through grid resistor 42, and the cathode is connected directly to ground. The plate of the thyratron 41 is connected through one gang of a selector switch 43, a manually selected coil 44, and resistor 45 to a positive power supply. The coils 44 form a part of a pulse variation determining circuit of which cutoff capacitors 46 are also components thereof. The capacitors 46 each have one end commonly connected to the commonly connected ends of the coils 44. Each of the capacitors 46 has its other end associated with a contact on a second gang of the selector switch 43 which connects it through a resistor 47 and the outer coil 12 of the probe 10 to ground.

The coils 44 and the capacitors 46 serve as a selective circuit for determining the length of the long pulse desired. The length of the pulse used depends on the depth of penetration of the deepest cracks or voids which it is desired to detect. If discontinuities deep below the surface of the metal sample are to be located, a coil and capacitor combination must be selected which will provide for a long discharge time of the selected capacitor 46 thus extending the duration of the pulse energizing the outer coil 12 of the probe 10.

The current for charging and discharging the capacitor 46 flows through the outer coil 12 of the probe 10 generating an electric field which is applied to the sample as well as the inner coil 11 of the probe. The resistor 47 in series with the outer coil 12 is provided for obtaining an auxiliary long pulse voltage signal, the purpose of which will be hereinafter described.

In the circuit for the short pulses the output from the cathode resistor 35 of the trigger pulse generator 30b is connected through coupling capacitor 37 to the grid of a thyratron tube 61 forming a part of the short duration pulse generator 60. The grid of the thyratron 61 is connected to ground through a resistor 63 and the cathode is connected directly to ground The plate of the tube 61 is connected through a coil 64, a resistor 65 and a second coil 66 to a positive power supply. A by-pass capacitor 67 along with coil 66 prevents any short pulses from being received at the power supply. The cutoff of the thyratron 61 is dependent upon the discharge of the capacitor 68 through series resistors 69 and 70 to ground. The short pulse signal is taken across the resistors through resistor 71 and capacitor 72 and applied to one half of the outer coil 12 of the probe 10. Thus the short duration pulses energize the outer coil 12 but not simultaneously with the long duration pulses applied thereto because of the out of phase triggering initiated by the multivibrator master oscillator 20. A second output for the short duration pulses is taken across the series resistors 69 and 70 and a third output is taken across resistor 70. The purpose of these auxiliary short pulse outputs will be hereinafter described.

The long and short duration pulses each induce an alternating current in the inner coil 11 of the probe 12 which tends to damp out after a few cycles because of the high impedance of the circuit connected thereto. The presence of a metal sample in the proximity of the probe 10 affects the current signal induced in the inner coil 11 in a manner reflective of the conductivity of the metal and the spacing between the probe 10 and the metal sample. It has been found however that the current waveform associated with the short duration of pulse is affected in such a way that the peak amplitude of the second half of the first cycle of the induced current waveform is unaffected in magnitude by changes in conductivity of the metal sample. It is theorized that this occurs because of the combined effect of the metallic sample on both the mutual inductance between the inner and outer coils and the self-inductance of the inner coil. The two parameters operate to maintain the first negative peak, in the instant circuit, at a constant amplitude, dependent only on the changes in the probe-to-sample spacing.

The current waveform induced in the inner coil 11 responsive to the long duration of pulses is affected by the conductivity of a metal sample such that when the conductivity increases, there is a greater attenuation of the signal induced in the inner coil 11 causing a reduced amplitude signal. If the metal sample is fabricated of a ferromagnetic material, however, it has been found that the opposite effect takes place, and an increase in the signal amplitude induced in the inner coil 11 will result. It is thus necessary to provide for this opposite effect in a later circuit as hereinafter described.

The current signal induced in the inner coil 11 is transmitted by means of lead 75 to the separation and stabilization circuit 80 (Fig. 4). The long and short pulse signals are separated by means of a high-pass filter comprising capacitor 81 and resistor 82, and a low-pass filter comprising coil 83, resistor 84, and capacitor 85. The long pulse signal is rectified in the right-hand section 86a of double-diode 86 and is transformed into a positive polarity saw-tooth voltage waveform by means of the resistor 87 and capacitor 88 in the cathode circuit of the tube.

Part of the generated long duration pulse output is taken across the resistor 47 (Fig. 3) as hereinbefore mentioned and is applied to the transformer 89 with separation and stabilization circuit 80 through leads 90 and 91. This induced voltage is used to counteract signal variations caused by changing thyratron anode voltages and other causes of instability in the long pulse generation circuits. The stabilization voltage is transmitted through a low-pass filter, comprising coil 92 and resistor 93, to the left-hand diode 86b of tube 86. The signal is rectified in the left-hand diode 86b of tube 86 and transformed into a large amplitude negative polarity saw-tooth wave by the capacitor 94 and potentiometer 95 in the plate circuit of the diode.

The saw-tooth waveform voltage appearing across the potentiometer 95 is opposite in phase and of substantially greater amplitude than the saw-tooth waveform voltage appearing across resistor 87. Hence, voltage variations caused by circuit instabilities will have a substantially small effect on the negative polarity saw-tooth appearing on the arm of the potentiometer 95.

A portion of the short pulse generated signal, hereinbefore mentioned, is transmitted through resistor 96, capacitor 97 (Fig. 3) and lead 98 to an auxiliary primary winding of the transformer 91. This signal is used to cancel out any components of the short pulse signal which may have been induced in the long pulse signal circuits.

The long duration pulse saw-tooth signal is transmitted from the potentiometer 95 through coupling capacitor 99 to the grid of a triode 100 which forms a part of a cathode follower circuit when switch 101 is in its indicated position. The plate of tube 100 is connected through contact 101a directly to the positive power supply and to ground through the by-pass capacitor 102. The cathode is connected to ground through series resistors 103 and 104 and grid resistor 105 couples the grid of the tube to the junction of the two cathode resistors. The output of the cathode follower connected stage is taken across cathode resistor 104 through a second contact 101b of the gang switch 101, coupling capacitor 106 and a third switch contact 101a to a diode pulse clipper 107 and a potentiometer 142 in the compensation stage 140. The pulse clipper with switch contacts 101c and 101d as shown eliminates any positive components of the signal passed therethrough to the compensation stage.

The arm of the potentiometer 142 is connected to the first grid of a pentagrid mixer tube 141 in the compensation stage 140 and a negative polarity waveform appears thereat responsive to the negative polarity saw-tooth input to the cathode follower connected circuit. As the circuit is shown in the drawings an increase in conductivity of the sample will cause a decrease in the signal generated in the inner coil 11 of the probe 10 and a decrease in the amplitude of the negative polarity waveform at the grid of pentagrid 141, thus increasing the output of the compensation stage.

If the metal sample being tested is a ferromagnetic material, it will have an opposite effect on the long pulse signal induced on the inner coil of the probe and hence will have an opposite effect on the signal applied to the grid of the pentagrid mixer 141. Therefore, provisions must be made for reversing the polarity of the signal so that an increase in conductivity of the sample will also result in an increase in the output of the tube 141. This is done by converting the circuit associated with the triode 100 into an ordinary amplifier by switching the gang switch 101 to its lower position. In this position the plate is connected to the positive power supply through the first contacts of switch 101 and a load resistor 108 with an A.C. path to ground through the by-pass capacitor 108a. Another contact 101e of the switch 101 connects the coupling capacitor 106 directly to the plate of tube 100, and contact 101b associated with the cathode of the tube 100 shorts out the resistor 104. The switch contacts 101c and 101d reverse the polarity of the diode pulse clipper 107. With the circuit so connected an increase in conductivity of the ferromagnetic sample will cause an increased amplitude of the negative saw-tooth signal at the grid of triode 100 and the output of the amplifier connected stage applied to pentagrid 141 will be a positive polarity signal, the amplitude increase therein causing an increase in the output of the compensation stage.

Returning to the short duration pulse waveform induced in the inner coil 11 of the probe 10, it is passed through the previously mentioned high-pass filter, comprising capacitor 81 and resistor 82 and rectified by the left-hand diode 109a of the double-diode tube 109. The signal is transformed into a negative polarity saw-tooth waveform by means of the capacitor 110 and resistor 111. The auxiliary short pulse voltage from across resistor 70 of the short pulse generator 60 (Fig. 3) is used as a stabilization voltage and is transmitted by means of lead 112 to the transformer 113. Responsive thereto a large amplitude, positive polarity short pulse saw-tooth waveform is formed by the right-hand diode 109b of tube 109, capacitor 114 and potentiometer 115. The oppositely phased waveform on resistor 111 and potentiometer 115 reduces the effect of instabilities in the short pulse circuits in the same manner as in the long pulse stabilization circuit.

The stabilized short pulse signal from the potentiometer 115 is transmitted through coupling capacitor 116 to the grid of triode 117 forming a part of a cathode follower circuit. The diode 118 connected to the potentiometer 115 is a pulse clipper to shunt the negative portions of the signal to ground. The plate of the triode 117 is connected to a positive power supply with an A.C. by-pass capacitor 119 to ground. The cathode of tube 117 is connected to ground through the parallel combination of capacitor 120 and resistor 121 in series with resistor 122. The resistor 123 couples the grid to the cathode circuit.

The output across the cathode resistor 122 is coupled to a diode clamp and filter circuit which includes the charging capacitor 124, diode 125, resistor 126, potentiometer 127 and the smoothing capacitor 128. The signal appearing at the arm of the potentiometer 127 is thus a negative, substantially D.C. signal which is applied directly to the third grid of the pentagrid mixer 141.

The short pulse signal operates to remove the effects of variations in probe-to-sample spacing as follows. A decrease in the probe-to-sample spacing (non-ferromagnetic sample) will cause a decrease in the amplitudes of the long pulse and short pulse signals induced in the inner coil 11 of the probe. In the case of the long pulse signal this will result in a decrease in the amplitude of the negative polarity waveform at the grid of pentagrid tube 141 and increase the tube's output.

In the case of the short pulse signal a larger positive polarity saw-tooth wave will be presented to the cathode follower circuit including triode 117. The diode clamp circuit shifts the positive polarity output of the cathode follower to a negative polarity signal as it appears at the third grid of pentagrid mixer 141. The negative bias on the third grid of the pentagrid tube 141 will reduce the tube's gain and hence reduce its output. The overall output of the pentagrid tube circuit, therefore, remains the same, despite the change in probe-to-sample spacing.

An increase in probe-to-sample spacing will result in the opposite effect in all of the circuits described above with a resultant constant output of the pentagrid mixer stage. It will be noted that the arm of potentiometer 127 is connected to a meter 160a which will indicate by its readings any changes in probe-to-sample spacing.

Continuing the description of the compensation stage 140, the plate of the pentagrid tube 141 is connected through load resistor 143 to a positive power supply and the cathode is connected to ground through the cathode resistor 144. The second and fourth grids are connected through dropping resistor 145 to the positive power supply with an A.C. by-pass through capacitor 146 to ground. The fifth grid is externally connected to the cathode. Capacitor 147 connected between the third grid and ground removes A.C. fluctuations appearing thereat.

The output of the compensation stage 140 taken across the load resistor 143 is coupled by means of capacitor 148 and resistor 149 to a diode rectifier 150. The rectified signal is filtered by means of the RC network comprising capacitor 151, resistor 152, and a tapped resistor 153 to remove any A.C. fluctuations therein. The D.C. signal is then transmitted to the compensated long pulse channel meter 160b through a selected tap on resistor 153 which serves as a scale selector for the meter.

As hereinbefore described, the long pulse channel meter 160b will give a reading responsive to the amplitude of the long pulse signal induced in the inner coil 11 of the probe 10. However, it meters only that part of the signal which is indicative of the conductivity of the metal sample, variations caused by the probe-to-metal spacing being compensated for by the short pulse signal. If the conductivity of the sample is reduced in the portion being tested because of a discontinuity such as a crack, bonding flaw or void, the signal appearing in the inner coil of the probe will be less attenuated resulting in a lower reading in the long pulse channel meter 160b.

It will be apparent to those skilled in the art from the disclosure herein of the principles of the invention and the description of the embodiment thereof that many modifications may be made from the scope of the invention which is not to be regarded as limited by the detailed description herein.

What is claimed is:

1. A metal conductivity determining device comprising: a long pulse signal source, a short pulse signal source, means proximately spaced from said metal for inductively coupling said long pulse signal source and said short pulse signal source to said metal, means for separating the long and short pulses, means mutually coupled to said induction coupling means for transmitting said pulses to the pulse separating means, and means for compensating the long pulse signal responsive to the short pulse signal whereby the compensated long pulse signal is a measure of the metal conductivity.

2. A metal conductivity determining device comprising: a long pulse signal source, a short pulse signal source, a probe having one end proximately spaced from said metal, said probe comprising a cylindrical ferromagnetic core having an annular recess in said proximately spaced end, a first coil disposed around said core adjacent to said proximately spaced end and connected to said long and short pulse sources, a second coil disposed within the annular recess in said core, means for separating the long and short pulses connected to said second coil, and means for compensating the long pulse signal responsive to the short pulse signal whereby the compensated long pulse signal is a measure of the metal conductivity.

3. A metal conductivity determining device comprising: an oscillator having two oppositely phased outputs, a long pulse generator coupled to one output of said oscillator, a short pulse generator coupled to the other output of said oscillator, a probe proximately spaced from said metal having a first coil and a second coil concentrically disposed within said first coil, the outputs of said long and short pulse generators each being connected to said first coil, long and short pulse signals being induced in said second coil responsive to said pulse generators, a signal separator having its input connected to said second coil, a compensator connected to the output of said separator wherein the amplitude of the long pulse signal is varied responsive to the amplitude of said short pulse signal, whereby the amplitude of the long pulse signal is a measure of the metal conductivity.

4. A metal conductivity determining device comprising: an oscillator having two oppositely phased outputs; a long pulse generator coupled to one output of said oscillator, a short pulse generator coupled to the other output of said oscillator, a cylindrical probe proximately spaced from said metal comprising a cylindrical ferrite core having one end proximately spaced from said metal, said end having an annular recess therein, a first coil disposed around said core adjacent to said proximately spaced end and connected to said long and short pulse generators, a second coil disposed within said annular recess; long and short pulse signals being induced in said second coil responsive to said pulse generators, a signal separator having its input connected to said second coil; a compensator connected to the output of said pulse separator wherein the amplitude of the long pulse signal is varied responsive to the amplitude of said short pulse signal whereby the amplitude of the long pulse signal is a measure of the metal conductivity.

5. A metal conductivity determining device comprising: a multivibrator having two oppositely phased outputs; a thyratron circuit coupled to one output of said multivibrator for generating long duration pulses, a second thyratron circuit coupled to the other output of said multivibrator for generating short duration pulses; a probe proximately spaced from the metal comprising a first coil and a second coil concentrically disposed within said first coil, said first coil coupled to the output of said first and second thyratron circuits, a band-pass network coupled to said second coil for separating long and short pulse signals induced in said second coil, a compensator circuit comprising an electronic vacuum tube having a plurality of grids, said tube adapted to receive the long pulse signal on one grid and the short pulse signal on a second grid, the output of said vacuum tube being a measure of the metal conductivity.

6. A metal conductivity determining device comprising: a multivibrator having two oppositely phased outputs; a thyratron circuit coupled to one output of said multivibrator for generating long duration low amplitude pulses, a second thyratron circuit coupled to the other output of said multivibrator for generating short duration high amplitude pulses; a probe comprising a cylindrical ferrite core having one end proximately spaced from said metal, said end having an annular recess therein, a first coil disposed around said core adjacent said end and connected to said first and second thyratron circuits, a second coil disposed within said annular recess concentrically with said first coil; a band-pass network coupled to said second coil for separating long and short pulse signals induced in said second coil; a compensator circuit comprising an electronic vacuum tube having a plurality of grids, said tube adapted to receive the long duration pulse signal on one grid and the short duration pulse signal on a second grid, the output of said vacuum tube being a measure of the metal conductivity.

7. A metal conductivity determining device comprising: a long pulse source; a short pulse source; a first coil proximately spaced from said metal for inductively coupling said long pulse source and said short pulse source to said metal; a second coil mutually coupled to said first coil, long and short pulse signals being induced therein responsive to said long and short pulses; means connected to said second coil for separating the long and short pulse signals; and means for compensating the long pulse signal responsive to the short pulse signal whereby the compensated long pulse signal is a measure of the metal conductivity.

8. A metal conductivity determining device comprising: a long duration low amplitude pulse source; a short duration high amplitude pulse source; a first coil proximately spaced from said metal for inductively coupling said long pulse source and said short pulse source to said metal, a second coil mutually coupled to said first coil, long and short pulse signals being induced therein responsive to said long and short pulses; means connected to said second coil for separating the long and short pulse signals; and means for compensating the amplitude of the long pulse signal responsive to the amplitude of the short pulse signal, whereby the compensated long pulse signal is a measure of the metal conductivity.

9. A metal conductivity determining device comprising: a long pulse source; a short pulse source; a probe comprising a cylindrical ferromagnetic core having one end proximately spaced from said metal, said core having an annular recess disposed within said end, a first coil disposed around said core adjacent to said end and connected to said long and short pulse sources, a second coil disposed within said recess concentrically with said first coil, long and short pulse signals being induced in said second coil responsive to said long and short pulses; means connected to said second coil for separating the long and short pulse signals; and means for compensating the long pulse signal responsive to the short pulse signal, whereby the compensated long pulse signal is a measure of the metal conductivity.

10. A metal conductivity determining device comprising: a long pulse source, a short pulse source, a first coil proximately spaced from said metal for inductively coupling said long pulse source and said short pulse source to said metal, a second coil concentrically disposed within said first coil, long and short pulse signals being induced in said second coil responsive to said long and short pulses, means for separating the long and short pulses connected to said second coil, and means for compensating the long pulse signal responsive to the short pulse signal, whereby the compensated long pulse signal is a measure of the metal conductivity.

11. A metal conductivity determining device comprising: a long duration low amplitude pulse source; a short duration high amplitude pulse source; a first coil proximately spaced from said metal for inductively coupling said long pulse source and said short pulse source to said metal, a second coil concentrically disposed within said first coil, long and short pulse signals being induced in said second coil responsive to said long and short pulses; means connected to said second coil for separating the long and short pulse signals; and means for compensating the amplitude of the long pulse signal responsive to the amplitude of the short pulse signal, whereby the compensated long pulse signal is a measure of the metal conductivity.

References Cited in the file of this patent
UNITED STATES PATENTS 2,116,119     Loewenstein _____ May 3, 1938

OTHER REFERENCES

Greenough: "Radio News" (Engineering Dept.), August 1947, pp. 11–13 and 26.

Waidelich: "Electronics," November 1955, pp. 146, 147.